May 8, 1945.  R. B. COTTRELL  2,375,207
TRUCK
Filed Nov. 1, 1943    2 Sheets-Sheet 1

INVENTOR.
Robert B. Cottrell,
BY
Atty.

INVENTOR.
Robert B. Cottrell
BY
Atty.

Patented May 8, 1945

2,375,207

UNITED STATES PATENT OFFICE 2,375,207

TRUCK

Robert B. Cottrell, Chicago, Ill., assignor to American Steel Foundries, Chicago, Ill., a corporation of New Jersey Application November 1, 1943, Serial No. 508,571

10 Claims. (Cl. 105—197)

My invention relates to railway car trucks and more particularly to a quick wheel change truck which may be readily utilized with or without a friction ride control device, as desired.

It will be understood that under some service conditions a ride control feature is not absolutely necessary and it may be desired to eliminate this feature in order to reduce the cost of maintenance. On the other hand, if it should later be desired to use the truck in high speed service, a ride control device is almost essential. It is therefore, a principal object of my invention to design a truck which incorporates a ride control device for high speed service and means for readily eliminating the device when desired.

My invention is an improvement of the truck shown and described in a co-pending application, Serial No. 441,072, filed April 30, 1942, in the joint names of Walter H. Baselt and John E. Flescher, and my improvement consists in so modifying the truck as to permit the substitution of filler blocks for the friction shoes under conditions wherein the development of friction is undesirable.

My novel truck comprises an arrangement in which the bolster is provided with wedge surfaces on the bottom thereof for cooperation with associated friction shoes which are thereby urged into engagement with the side frame columns, and I also provide novel filler blocks which may be substituted for the friction shoes and which have means for interlocking with the bolster, thus preventing the blocks from being urged into engagement with the columns.

Figure 2:
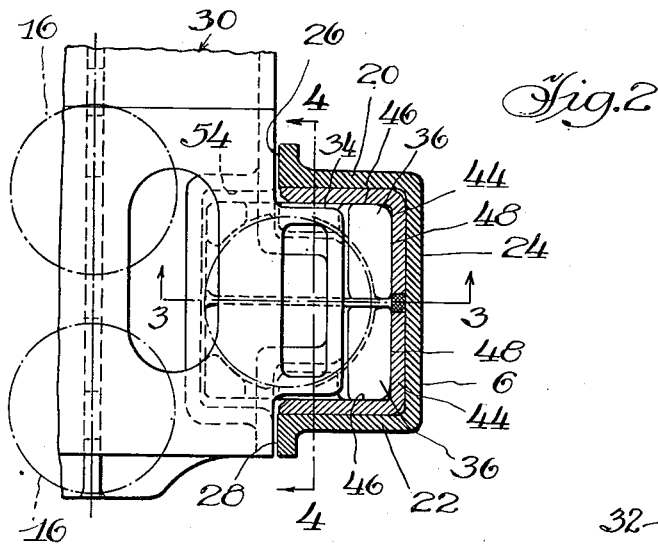
Figure 2 is a fragmentary top view of the structure shown in Figure 1 with the side frame column illustrated in section.
Figure 3:
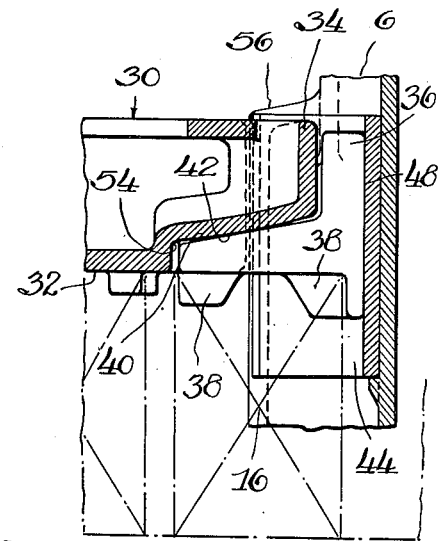
Figure 1:
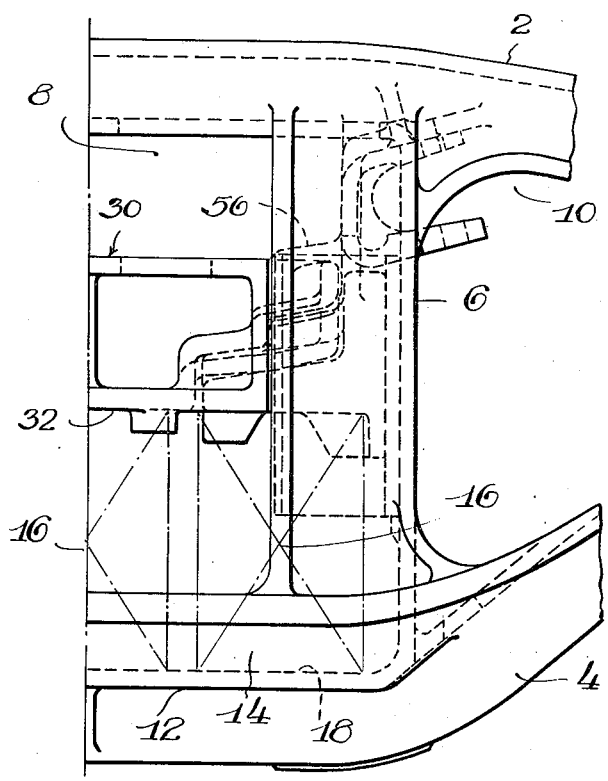
Figure 1 is a fragmentary side elevation of a railway car truck to which my invention may be applied, only one end of the truck being illustrated inasmuch as it is symmetrical in design.
Figure 4:
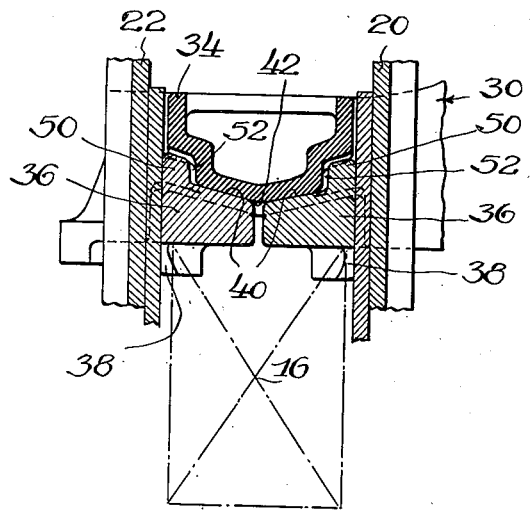

Figures 3 and 4 are sectional views taken respectively in the planes indicated by the lines 3—3 and 4—4 of Figure 2.

Figure 5:
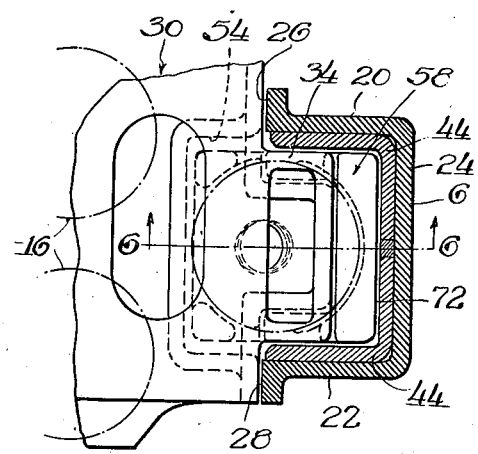

Figure 5 is a fragmentary sectional view comparable to Figure 2 and illustrating the truck as designed to accommodate the filler blocks in accordance with my invention.

Figure 6:
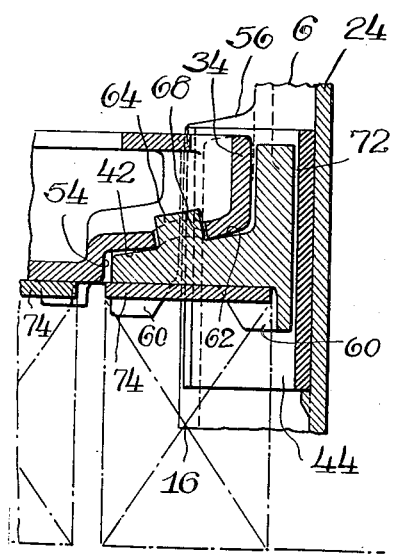

Figure 6 is a fragmentary sectional view taken in the plane indicated by the line 6—6 of Figure 5.

Figure 8:
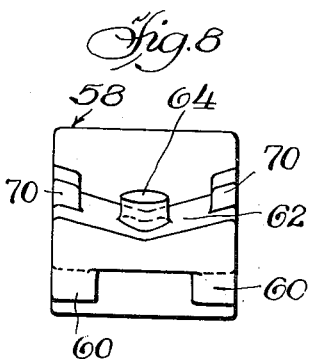
Figure 7:
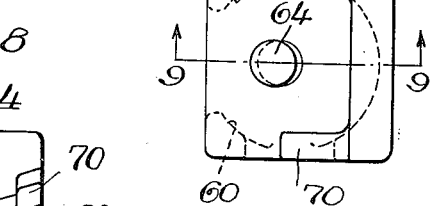
Figure 9:
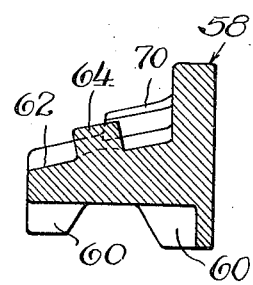

Figures 7 to 9 inclusive illustrate in detail my novel filler block, Figure 7 being a top plan view thereof, Figure 8 being an elevational view taken from the bolster engaging face thereof, and Figure 9 being a sectional view taken in the plane indicated by the line 9—9 of Figure 7.

Describing my invention in detail and referring first to Figures 1 to 4, the truck is substantially identical with that illustrated and described in said co-pending application. The side frame comprises the compression member 2 and the tension member 4 merging adjacent each end of the truck with a column 6 defining with said members a bolster opening 8 and a window opening 10. The tension member 4 beneath the bolster opening is of well-known form comprising a box-section with the top chord 12 thereof widened and formed at each of the inboard and outboard sides thereof with an upstanding flange 14 affording convenient confining means for the lower ends of the bolster supporting springs 16, 16 seated as at 18 upon the top chord 12 of the tension member.

Each column is of U-section, as illustrated in Figure 2, comprising the inboard and outboard legs 20 and 22 connected by the transverse web 24, said legs presenting respectively the aligned inboard and outboard bolster guide surfaces 26 and 28 for cooperation with the adjacent side of the bolster generally indicated at 30, said bolster being seated at 32 upon certain of the springs 16, 16 and being provided at each side thereof with a wing portion 34 extending between the inboard and outboard legs of the adjacent column 24.

Received between the inboard and outboard legs of each column are a pair of inboard and outboard friction shoes 36, 36 seated upon one of the coil springs 16 and having positioning means 38, 38 cooperating therewith, each of said shoes presenting a wedge face 40 sloping downwardly toward the longitudinal center line of the side frame and toward the transverse center line thereof, as will be understood from a comparison of Figures 3 and 4, and each wing portion 34 of the bolster comprises on the bottom thereof the diagonal V-shaped wedge surface 42 seated upon the faces 40, 40 of the associated friction shoes whereby the same are urged into frictional engagement with the liners 44, 44 mounted on the column 6, each shoe being urged transversely of the truck to frictionally engage the associated liner at 46, and each shoe being urged longitudinally of the truck to frictionally engage said liner at 48 as described in detail in the above-mentioned co-pending application.

It may be noted that each friction shoe comprises at opposite sides thereof upstanding lugs 50, 50 for guiding engagement with recesses 52, 52 in the sides of the adjacent wing portion 34, and likewise, it may be noted that the wedge surface 42 on said wing portion extends downwardly into a pocket 54 (Figure 3) formed in the bottom wall of the bolster. The inboard leg 20 of each column is relieved as at 56 (Figures 1 and 3) to afford clearance for the associated wing portion 34 of the bolster as the latter is elevated in the bolster opening and removed therefrom during a quick wheel change, while the spring 16, 16 and the friction shoes 36, 36 remain in normal assembled relationship with the side frame.

Figures 5 and 6 illustrate my invention as applied to the truck illustrated in Figures 1 to 4 inclusive, the bolster being provided with interlocking means for a filler block which may be inserted to replace the shoes 36, 36, as hereinafter discussed. The filler block 58 is shown in detail in Figures 7 to 9 inclusive from which it will be seen that this member is a substantially solid forging or casting comprising on the bottom thereof spring positioning lugs 60, 60 for cooperation with the supporting spring 16. The block also comprises the diagonal V-shaped face 62 against which may seat the associated wedge surface 42 of the bolster, and substantially centrally thereon the face 62 is formed with an upstanding lug 64 for reception within an opening 68 formed in the bottom wall of the bolster. At opposite sides thereof the block 58 is formed with the lugs 70, 70 for guiding cooperation with the recesses 52, 52 in the wing portion 34 of the bolster.

It will be understood that the lug 64 of the filler block is effective to interlock the same with the bolster, thus preventing said block from being urged into frictional engagement with the associated column members 44, 44. Thus, it will be understood that the bolster is free to oscillate on the springs 16, 16 without a dampening action such as would be afforded by the friction shoes 36, 36. It may be noted that movements of the bolster longitudinally of the frame are limited by the bolster guide surfaces 26 and 28 inasmuch as the distance indicated at 72 between the filler block and the liner 44, plus the clearance of the lug 64 from the margin of the associated opening 68 is greater than the clearance between the surfaces 26 and 28 and the adjacent side of the bolster. It may be also noted that out-of-square movement of the bolster with respect to the side frame is limited by abutment of the wing portions 34, 34 of the bolster with the inboard and outboard legs of the columns inasmuch as the bolster and the filler blocks 58, 58 are afforded relative pivotal or swiveling movement by means of the lugs 64, 64, such pivotal movement being resisted to some extent by friction developed against the faces 62, 62 of the filler blocks.

It will be understood that the embodiment illustrated in Figures 5 and 6 is substantially identical with that illustrated in Figures 1 to 4 inclusive except for the fact that the filler blocks 58, 58 are substituted for the shoes 36, 36, and in Figure 6 shims 74, 74 are associated with the springs 16, 16.

Thus it will be seen that I have devised a novel quick wheel change railway car truck in which oscillations of the bolster may, if desired, be dampened by friction devices cooperating with the side frame columns, said devices being replaceable by filler blocks to eliminate friction under service conditions where it is desired to decrease maintenance costs.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck, a side frame comprising compression and tension members and spaced columns defining therewith a bolster opening, each column having spaced inboard and outboard legs and a transverse web, a plurality of springs on said tension member in said opening, filler blocks supported from certain of said springs, each of said blocks being disposed between the spaced legs of the adjacent column and each of said blocks having a V-shaped face sloping downwardly from the adjacent column and an upstanding lug on said face substantially centrally thereof, and a bolster supported on other of said springs and having wing portions extending between the spaced legs of respective columns, said wing portions having complementary surfaces seated on respective of said faces and each of said wing portions having an opening complementary to and receiving the associated of said lugs, the inboard leg of each column being relieved to afford clearance for the associated wing portion whereby said bolster may be elevated in said bolster opening and removed therefrom during a quick wheel change.

2. In a railway car truck, a side frame comprising compression and tension members and spaced columns defining therewith a bolster opening, each column having spaced inboard and outboard legs and a transverse web, a plurality of springs on said tension member in said opening, filler blocks supported from certain of said springs, each of said blocks being disposed between the spaced legs of the adjacent column and each of said blocks having a V-shaped face sloping downwardly from the adjacent column and an upstanding lug on said face substantially centrally thereof, and a bolster supported on other of said springs and having wing portions extending between the spaced legs of respective columns, said wing portions having complementary surfaces seated on respective of said faces and each of said wing portions having an opening complementary to and receiving the associated of said lugs, the distance between the sides of the bolster and the legs of the columns being less than the clearance between the blocks and the transverse webs of the columns, plus the clearance of the lugs from their associated openings.

3. In a railway car truck, a side frame having compression and tension members and spaced columns defining therewith a bolster opening, each column having spaced inboard and outboard legs and a transverse web, a plurality of springs on said tension member in said opening, filler blocks supported from certain of said springs, each of said blocks being disposed between the spaced legs of the adjacent column, and each of said blocks having a V-shaped face sloping downwardly from the adjacent column, and a bolster supported on other of said springs and having wing portions with complementary surfaces seated on respective faces, and complementary means on said bolster and said blocks for preventing the latter from moving toward the adjacent columns, the inboard leg of each column being relieved to afford clearance from the associated wing portion as said bolster is elevated in said bolster opening and removed therefrom during a quick wheel change.

4. In a railway car truck, a side frame having spaced columns and an intervening bolster opening, each column having spaced inboard and outboard legs and a transverse web, a plurality of springs on said frame in said opening, filler blocks supported from certain of said springs, each of said blocks being disposed between the spaced legs of the adjacent column and each of said blocks having a face sloping downwardly from the adjacent column, and a bolster supported on other of said springs and having wing portions extending between the spaced legs of respective columns and seated on respective of said faces, and means interlocking said blocks with said bolster to substantially prevent relative movement therebetween longitudinally of the frame, said last-mentioned means being formed and arranged to permit relative swiveling action between said blocks and said bolster during out-of-square movement thereof with respect to the frame.

5. In a railway car truck, a side frame having spaced columns and an intervening bolster opening, a plurality of springs on said frame in said opening, filler blocks on certain of said springs adjacent respective columns, a bolster supported on other of said springs and having wedge faces sloping downwardly from respective columns and seated on complementary surfaces on said blocks, and means removably interlocking said bolster and blocks for preventing the latter from moving toward respective columns, said interlocking means comprising means permitting relative swiveling action between said blocks and said bolster during out-of-square movement thereof with respect to the frame, said blocks and associated portions of said bolster being housed between inboard and outboard legs of respective columns.

6. In a railway car truck, a side frame having spaced columns and an intervening bolster opening, a plurality of springs on said frame in said opening, filler blocks on certain of said springs adjacent respective columns, a bolster supported on other of said springs and having wedge faces sloping downwardly from respective columns and seated on complementary surfaces on said blocks, means interlocking said bolster and blocks for preventing the latter from moving longitudinally of the frame toward respective columns, and means on each side of said bolster received between inboard and outboard legs of respective columns, the inboard legs of said columns being relieved to afford clearance from said last-mentioned means as said bolster is elevated in said bolster opening and removed therefrom during a quick wheel change.

7. In a railway car truck, a side frame having compression and tension members and spaced columns defining therewith a bolster opening, each column having spaced inboard and outboard legs and a transverse web, a plurality of springs on said tension member in said opening, filler blocks supported from certain of said springs, each of said blocks being disposed between the spaced legs of the adjacent column, and each of said blocks having a V-shaped face sloping downwardly from the adjacent column, and a bolster supported on other of said springs and having wing portions with complementary surfaces seated on respective faces, and complementary means on said bolster and said blocks for preventing the latter from moving toward the adjacent columns.

8. In a railway car truck, a side frame having spaced columns and an intervening bolster opening, a plurality of springs on said frame in said opening, filler blocks on certain of said springs adjacent respective columns, a bolster supported on other of said springs and having wedge faces sloping downwardly from respective columns and seated on complementary surfaces on said blocks, and means removably interlocking said bolster and blocks for preventing the latter from moving toward respective columns, said means permitting relative swiveling action between said blocks and said bolster during out-of-square movement thereof with respect to the frame.

9. In a filler block for a railway car truck, a member having a spring seat on the bottom thereof and a V-shaped wedge surface on the upper side thereof, and an interlocking lug projecting upwardly from said surface substantially centrally thereof.

10. In a filler block for a railway car truck, a member having a substantially horizontal spring seat on the bottom thereof and a wedge surface on the upper side thereof diagonally disposed with respect to said seat, and an interlocking lug projecting upwardly from said surface substantially centrally thereof.

ROBERT B. COTTRELL.